United States Patent [19]

Beigler et al.

[11] 3,993,746

[45] Nov. 23, 1976

[54] COMPOSITIONS FOR CULTURING AND/OR CAPTURING FISH AND CRUSTACEA

[75] Inventors: Myron A. Beigler, Palo Alto; Ronald J. Amen, Sunnyvale, both of Calif.

[73] Assignee: Syntex (U.S.A.) Inc., Palo Alto, Calif.

[22] Filed: Apr. 10, 1975

[21] Appl. No.: 567,037

Related U.S. Application Data

[62] Division of Ser. No. 372,342, June 21, 1973, Pat. No. 3,903,260.

[52] U.S. Cl. .................................. 424/78; 424/84; 424/319; 426/650
[51] Int. Cl.$^2$ ................. A61K 31/195; A61K 31/74
[58] Field of Search ...................... 424/319, 84, 78; 426/650

[56] References Cited

UNITED STATES PATENTS

| | | | |
|---|---|---|---|
| 3,591,391 | 7/1971 | Kinoshita et al. | 426/650 |
| 3,711,301 | 1/1973 | Asogawa et al. | 426/650 |
| 3,770,463 | 11/1973 | McSweeney et al. | 426/650 |

*Primary Examiner*—Sam Rosen
*Attorney, Agent, or Firm*—Tom M. Moran; Larry S. Squires

[57] ABSTRACT

Feeds, medicaments, and baits for inducing exploratory feeding behavior in fish and crustacea which comprise monosodium glutamate and alkali metal aspartate in combination with conventional fish or crustacea food or with a medicament or, in the case of baits, with a non-toxic bulk material.

12 Claims, No Drawings

COMPOSITIONS FOR CULTURING AND/OR CAPTURING FISH AND CRUSTACEA

This is a division of application Ser. No. 372,342 filed June 21, 1973, now U.S. Pat. No. 3,903,260 issued Sept. 2, 1975.

BACKGROUND OF THE INVENTION

1. Field of the Invention

This invention relates to methods of inducing a feeding response in fish and crustacea by the application of certain amino acids and combinations thereof. In a further aspect this invention relates to methods of promoting the growth of cultured fish and crustacea by improving feed efficiency. In a still further aspect this invention relates to methods of attracting fish and crustacea. In another apsect this invention relates to fish and crustacea feeds and baits comprising an amino acid or combination of amino acids which induces a feeding response in fish and crustacea.

2. The Prior Art

One of the primary problems encountered in culturing fish and crustacea is the problem of poor feed efficiency; expressed as the ratio feed expended to the feed consumed. This problem transcends both the small scale aquarium used by the fish enthusiasts to the large scale commercial facilities used for production of fish and crustacea for food purposes. Failure of the fish and crustacea to consume the necessary quantity of food will cause the aqua life to grow at a rate insufficient to facilitate commercial exploitation and ultimately will result in malformity and death of the aqua life. Further as well as wasting feed, the unconsumed feed causes contamination problems resulting in pollution of the water or bed, which in turn typically results in disease or death of the aqua life. This is especially true in the case of the more sensitive varieties of aqua life such as tropical fish and certain crustacea, e.g. lobster, salt water and fresh water shrimp. Poor feed efficiency is generally attributable to the failure of the aqua life to actually find and/or consume the food supplied to them. Accordingly, we have now discovered that by using a selected amino acid and especially certain combinations of such amino acids in conjunction with feeding, we are able to induce a feeding response in aqua life, thus greatly improving feed efficiency and alleviating the problems incident to poor feed efficiency.

The concept of using luring essences to attract various aqua life is old to the art. Typically, such essences are concentrates of dead fish or other animal matter of manufactured chemicals similar to such concentrates; note, for example, U.S. Pat. No. 2,452,553. Generally, such luring essences have been used as baits or attractants to catch or trap wild aqua life and accordingly since the compositions used, in our invention, induce a strong feeding response and correspondingly an attraction for aqua life, our compositions can also be used either in combination with or in conjunction with various baits.

SUMMARY OF THE INVENTION

In summary the invention comprises methods of inducing a feeding response in fish and/or crustacea by applying a combination of lysine and glycine; or water soluble salts thereof, or a combination of monosodium glutamate and an alkali metal aspartate, in the vicinity of the fish and/or crustacea. Alternatively the respective amino acids or salts can be used separately but are not nearly as effective.

In summary the invention also comprises fish and/or crustacea feeds and baits comprising less than 10% by weight of the aforedescribed combination of amino acids or amino acid salts or the respective amino acids independently.

The invention will be further described herein below.

FURTHER DESCRIPTION OF THE INVENTION AND PREFERRED EMBODIMENTS

Considering the invention in greater detail, we have found that certain amino acids are able to induce a feeding or hunting response in fish and crustacea and that even as between the amino acids which are able to induce such a response the intensity and duration of the response will vary with the particular amino acid. Thus, we have found that monosodium glutamate elicits a very strong hunting or feeding response such that the fish and crustacea behave in a very excited or alarmed fashion. Further the response elicited by monosodium glutamate is, for some unexplained reason, much stronger than that elicited by glutamine, but both are of relatively short duration. In contrast to monosodium glutamate, we have found that alkali metal aspartates elicits a strong hunting or feeding response for a sustained period of time though less intense than sodium glutamate. Thus, we have found the combination of monosodium glutamate and an alkali metal aspartate to be particularly advantageous in that the initial frenzy response elicited by monosodium glutamate initially attracts the fish and/or crustacea to the feed, bait or trap, and the sustained action of alkali metal aspartate continues the attraction at a desirably strong rate, but not at the frenzy which is induced by monosodium glutamate, and which would be undesirable for a long period of time in that it would cause the animals to destroy or damage each other. The relative ratio of monosodium glutamate to alkali metal aspartate can vary over a wide range but typically is in the range of about from .1 to 10 grams of monosodium glutamate per gram of alkali metal aspartate and typically best results are obtained using a weight ratio of about from 0.5 to 2. The intensity and duration of the feeding response will vary somewhat with the particular species of fish or crustacea. We have further found that monosodium glutamate and especially the combination monosodium glutamate and alkali metal aspartate are exceptionally effective in inducing a feeding or hunting response in the following species of crustacea; *Macrobrachium rosenbergi, Macrobrachium americanum;* and families of fish; *Poeciliidae, Cyprinidae, Cichlidae, Anabautidae* and *Characidae*. The term alkali metal aspartate refers to the group of sodium aspartate, potassium aspartate, lithium aspartate and mixtures thereof. Typically best results are obtained using potassium aspartate.

In further embodiment we have discovered that both lysine hydrochloride and glycine are able to individually elicit a slight or moderate hunting or feed response in fish and crustacea, and that by combining lysine hydrochloride and glycine we are able to obtain a synergistic effect in that a very strong hunting or feeding response in induced which is much greater than the response induced by the amount of lysine hydrochloride or glycine individually equal to the total quantity of the combination. Typically a weight ratio of about from 0.1 to 10 grams of lysine hydrochloride per glycine, preferably 0.5 to 2. Also while we have found particularly good results to be obtained using the hydrochloride salt of lysine, the free base itself could also be used.

For convenience, the amino acids and amino acid concentrations will herein after be generically referred to as exploratory feeding behavior (EFB) inducing agents. The EFB inducing agents can be used by merely introducing the agent to aqueous environment of the aqualife (i.e. fish and/or crustacea). The optimum quantity of EFB inducing agents used will vary with the particular species of aqualife and also the extent of the aqueous environment. We have found, however, that typically good results can be obtained by applying sufficient EFB inducing agents to yield an aqueous environment concentration of about from 0.01 to 20 micrograms of EFB inducing agent per milliliter.

The fish and/or crustacea feeds, of our invention, comprises a nutritional source in combination with the exploratory feeding behavior (EFB) inducing agents, of our invention, and preferably also contains a binder. The nutritional source contains at least one source of protein and optionally can also contain suitable vitamins and growth promoting agents. Suitable protein sources which can be used include, for example, fish meal, casein, clam meal, yeast, corn meal, soya meal, peanut meal, and the like. Optimum ingredients will vary with the particular nutritional requirements of the particular species of fish or crustacea being cultivated and also with respect to the economics of the purpose for which they are being cultured (e.g. whether for food production or for asthetic reasons). The feed can also contain small quantities of antibiotics or other medicaments and alternatively the EFB-inducing agents of the invention can be used to enhance the reception of antibiotics or other medicaments by combining the EFB-inducing agent with a medicament and a suitable carrier and/or binder. Where the feed is used as a crustacean feed, suitable vitamins which can be used include the fat soluble vitamins (A, D, E and K) and the water soluble vitamins (B complex and C). With respect to crustacea, suitble growth promoting agents which can be used include, for example, glycogen. U.S. Pat. No. 3,699,244 also describes a number of growth promoting agents which can be used to promote the growth of fish. With respect to the binder, any non-toxic binder can be used provided, however, the binder is only slightly soluble in water. It is necessary that the binder is slightly soluble to permit the EFB-inducing agent to diffuse from the feed and thus attract fish or crustacea to the feed, at the same time the binder must be sufficiently insoluble in water to prevent the feed from deteriorating prematurely in the water. Suitable binders which can be used include, for example, starch, guar gum, carboxymethylcellulose, carrageenin, tragacanth gum and the like.

The feed composition or medicament composition of our invention contains less than 10%, by weight, of the EFB-inducing agent and typically will have an EFB-inducing agent concentration of about from 0.001 to 5 weight percent and preferably about from 0.05 to 1 weight percent. The EFB-inducing agent can be added as a separate ingredient in a solid or crystalline form or it can be added as part of the nutritional component or as part of the binder. For example, the composition can be prepared by first impregnating the nutritional component and/or binder with an aqueous solution of the EFB-inducing agent prior to compounding. Alternatively, the feed can be impregnated after compounding, but, in this case, care must be taken to insure that a binder is selected which will not deteriorate during the impregnation. In a further embodiment, the EFB-inducing agent can be applied as a coating, according to conventional procedures in combination with a suitable coating material. This is particularly useful in the case of medicament compositions wherein the medicament is applied as a core material containing or impregnated with the medicament and then is coated with a coating material containing or impregnated with the EFB-inducing agent. Suitable coating materials which can be used include, for example, lactose, calcium carbonate, soy bean phospholipids, cellulose, alginate, methyl cellulose, carboxymethylcellulose, polyacrylic, polyvinyl pyrrolidone and the like.

The EFB-inducing agent-feed combinations and EFB-inducing agent-medicament combinations of the invention can be prepared according to conventional mixing and compounding procedures such as are well known to the art, and are, for example, described in the literature. Various procedures are also described in the patent art such as, for example, U.S. Pat. No. 3,591,389 (gelling fish food composition) and U.S. Pat. No. 3,671,261 (shrimp feeds). Further, we have found the following mixing compounding procedure to be a particularly convenient mode of preparation. The EFB-inducing agents are blended with all other ingredients. This blended powder is then placed in an extruder common to the grain industries. Water is then added in quantity consistent with the powdered formulation to develop an extrudable texture. The moist material is then extruded into cylinders and then dried to approximately five percent moisture.

The bait compositions, of our invention, comprises the EFB-inducing agents, of the invention, in combination with a suitable non-toxic bulk material and optionally a non-toxic binder. Primarily for economic reasons, the concentration of the EFB-inducing agent in the bait is preferably less than 10%, by wt. The bulk material can be any material which is reasonably insoluble in water and can in fact be the feed, of the invention, or preferably can be less expensive filler materials such as, for example, saw dust, ground corn husks, and the like. The bait can be prepared according to any suitable compounding procedure and typically can be prepared in the same manner as the feeds described above. For example, the bulk material can be impregnated with a solution of the EFB-inducing agent and/or can be compounded with the bulk material with a non-toxic binder. A fairly elaborate procedure is, for example, described in U.S. Pat. No. 3,437,488. Conveniently, the bait can be used by placing the bait in a porous container which is suitably affixed to the trap or other mechanism used to catch the fish or crustacea. Thus, for example, in a conventional fishing lure the bait can be applied in a porous or perforated tube affixed to or located on the hook or near the hook. Correspondingly, any suitable method of applying luring baits can be applied to the EFB-inducing agents of our invention, for example, those described in U.S. Pat. No. 2,452,553.

A further understanding of the invention can be had from the following illustrative non-limiting examples.

EXAMPLE 1

This example illustrates the hunting or feeding response induced in crustacea by the amino acid and amino acid combinations used in our invention versus certain other amino acids. In this example, a three milliliter aliquot of a five percent aqueous solution of the particular amino acid or combination to be tested is introduced by pipette into a water filled standard commercial 20 gallon aquarium containing either a single adult prawn (male or female) or a community of juvenile prawns (mixed sexes) of the species of fresh water shrimp *Macrobrachium americanum*. Eight aquaria are utilized, three of which contain single adult males, two of which contain single adult females, and three of which contain a community of juvenile prawns. The ultimate concentration of the amino acids in the aquariums is approximately 2 µg. per milliliter. After the respective amino acid or amino acid combination is introduced, the prawns are visually observed for any apparent changes in their behaviors. If a response is elicited, it usually took only about 10 to 20 seconds and always less than one minute to occur. The response lasts from as brief a period as 15 seconds in some cases to as long as several minutes in other cases. The response is subjectively graded from −1 to +4. A grade of −1 means the animal appeared inhibited by the particular amino acids being tested. A grade of 0 means that there is no change in the animal behavior and correspondingly no apparent effect elicited by the particular amino acids. A rating of +1 through +3 signifies a positive response to the amino acid which encourages the prawns to either begin searching for food or to become extremely active and even aggressive. A rating of +4 is used in those cases where the amino acid or amino acid combination induces a response or activity notably greater than +1 through +3. The results of this test are summarized in the following table:

TABLE I

| Amino Acid or Amino Combination | Response Rating (Average[2] of all aquaria) | Approximate Duration of Response (Average[2] of all aquaria) |
|---|---|---|
| Cysteine | −1 | 2–3 min. |
| Asparagine | 0 | — |
| Lysine hydrochloride | +2 | 1 min. |
| Glycine | +2 | 1 min. |
| Lysine hydrochloride and Glycine *[1] | +4 | 2–3 min. |
| Monosodium glutamate | +4 | 1–1½ min. |
| Monosodium Aspartate | +3 | 1½–3 min. |
| Monosodium glutamate and Monosodium Aspartate *[1] | +4 | 2–3 min. |

*[1] 1:1 wt. ratio used.
*[2] With respect to any given amino acid or amino acid combination, essentially the same response with observed in each aquarium.

EXAMPLE 2

This example illustrates methods of preparing an attractant feed, of our invention, which is especially suited for fish. In this example a dry mixture containing 7 lbs. of fish meal, 3.2 lbs. high lysine corn, 1.36 lbs. of mixed minerals (including calcium, phosphorus, magnesium, sodium, potassium, chlorine, iron, zinc and others naturally present in the ingredients), 0.8 lbs. of rolled oats, .64 lbs. of mixed vitamins (i.e. vitamins A, C, D, E, K and the vitamin B complex), .05 lbs. of monosodium glutamate, .05 lbs. monosodium aspartate, .02 lbs. of sodium benzoate, and .02 lbs. potassium sorbate is dry blended in a commercial mixture at room temperature. To the blend is then added 1.2 lbs. of wheat germ oil, 0.8 lbs. of whey, and 0.75 lbs. of corn oil. The mixture is then blended and mixed until a homogeneous mixture is obtained. 84.11 lbs. of water is then added to the mix, and the composition mixed until a homogeneous slurry is obtained. The mixture is then passed through a commercial roller dryer resulting in the formation of a thin flaked product which readily releases the amino acid attractants (i.e. monosodium glutamate and monosodium aspartate) when introduced into an aqueous medium.

EXAMPLE 2A

This example illustrates a method of preparing an attractant feed, of our invention, similar to that prepared in Example 2, but having a particular size, especially suited for crustacea, e.g. fresh water shrimp. In this example the same formulation is used as in Example 2 with the exception that lysine hydrochloride and glycine are substituted for the monosodium glutamate and monosodium aspartate, respectively. The material is then blended into a slurry in the same manner as Example 2, and then extruded through an extruder into about 178 to one inch long cylinders having diameters ranging about from ⅜ to 3/8 inch. The extrudate is then dried in drying ovens at a temperature of about 40° to 50° C, to a moisture content of about 5%. The resulting dry extrudates are particularly suited for crustacea because of their particle size, and further readily release the amino acid attractants when introduced into an aqueous medium.

EXAMPLE 3

In this example the feed of Example 2 is tested with various species of tropical fish by feeding samples of the feed to aquaria containing two members, of the species, of each of the species of fish identified in Table 2. In each case the fish became unusually excited upon the application of the feed to the aquarium water. The excitation is substantially greater than observed for conventional commercial tropical fish feed and lead to aggressive behavior and an active feeding pattern.

TABLE 2

| SPECIES | COMMON NAME | FAMILY | COMMON FAMILY NAME |
|---|---|---|---|
| Hyphessobrycon Cardinalis (Cheirodon Axelrodi) | Cardinal Tetra | Characidae | Characins |
| Cholisa Lalia | Dwarf Gourami | Anabantidae | Labyrinth Fish Anabantids |
| Peterophyllum Scalare (Pterophyllum Eimekei) | Black or Black Lace Angel Fish | Cichidae | Cichlids |

TABLE 2-continued

| SPECIES | COMMON NAME | FAMILY | COMMON FAMILY NAME |
| --- | --- | --- | --- |
| Mollienisia Sphenops | Marbled or Orange Tail Mollie | Poeciliidae | Gambusinos or Live bearing Tooth Carps |
| Barbus Nigrofasciatus | Black Ruby Barb | Cyprinidae | Carps or Minnows |
| Xiphophorus Hellerii | Swordtail | Foeciliidae | Gambusinos |

EXAMPLE 4

In this example the feed of Example 2A is tested with goldfish by feeding a sample of the feed to five aquaria containing seven to 10 goldfish per aquarium. In each case the goldfish became unusually excited upon the application of the feed to the aquarium water. The excitation is substantially greater than observed for commercial goldfish feed and lead to aggressive behavior and an active feeding pattern.

EXAMPLE 5

In this example the conditions of Example 3 are repeated but a commercial tropical fish feed is added to one end of the aquaria and the fish allowed to find and start feeding on the commercial tropical fish feed prior to the addition of the feed prepared in Example 2. The feed of Example 2 is then carefully added to the portion of the aquaria water furthest from the commercial feed, without disturbing the aquarium water. In each instance the fish abandoned the commercial fish feed and swam over to, and began feeding on, the feed of Example 2.

EXAMPLE 5A

In this example the procedure of Example 5 is repeated but using brine shrimp as standard feed with goldfish and the feed of Example 2A as the test feed. The goldfish ignored the brine shrimp and the the fish feed of Example 2A.

EXAMPLE 6

In this example the feed of Example 2A is fed to the same crustacea aquaria system as used in Example 1. In each instance the response elicited by the feed of Example 2A is essentially identical to that obtained for the combination of lysine hydrochloride and glycine reported in Example 1.

Obviously many modifications and variations of the invention, described herein above and below in the claims, can be made without departing from the essence and scope thereof.

What is claimed is:

1. An aqua life feed comprising at least one protein source, a non-toxic binder which is slightly soluble in water, and an effective amount of an exploratory feeding behavior inducing agent which is a mixture of monosodium glutamate with an alkali metal aspartate wherein said feed contains less than 10% by weight of said exploratory feeding behavior inducing agent.

2. The composition of claim 1 wherein said binder is selected from the group consisting of starch, guar gum, carboxymethylcellulose, carrageenin, tragacanth gum and mixtures thereof.

3. The composition of claim 1 wherein said protein source is selected from the group consisting of fish meal, casein, clam meal, yeast, corn meal, soya meal, peanut meal, and mixtures thereof.

4. The composition of claim 1 wherein said feed composition contains about from 0.001 to 5 percent, by weight, of said feed inducing agent.

5. The composition of claim 15 wherein said feed composition contains about from 0.05 to 1 percent, by weight, of said feed inducing agent.

6. A medicament composition for fish and crustacea which comprises a fish or crustacea medicament in combination with a binder and an effective amount of an exploratory feeding inducing agent which is a mixture of monosodium glutamate and alkali metal aspartate, said composition containing less than 10% by weight of said exploratory feeding agent.

7. The medicinal composition of claim 6 wherein said medicament is an antibiotic.

8. The composition of claim 6 wherein said medicament composition is coated with a slightly water soluble coating material containing said exploratory feeding inducing agent.

9. The composition of claim 8 wherein said coating agent is selected from the group consisting of lactose, calcium carbonate, soy bean phospholipids, cellulose, alginate, methyl cellulose, carboxymethylcellulose, polyacrylic, polyvinyl pyrrolidone and compatible mixtures thereof.

10. The composition of claim 6 wherein said composition contains from 0.001 to 5 percent, by weight, of said feed inducing agent.

11. An aqua life bait composition which comprises a non-toxic bulk material in combination with an effective amount of an exploratory feeding inducing agent which is a mixture of monosodium glutamate and alkali metal aspartate.

12. The composition of claim 11 wherein said bait composition contains a non-toxic binder and wherein said non-toxic bulk material is selected from the group consisting of saw dust, ground corn husks and mixtures thereof.

* * * * *

UNITED STATES PATENT AND TRADEMARK OFFICE
CERTIFICATE OF CORRECTION

PATENT NO. : 3,993,746
DATED : November 23, 1976
INVENTOR(S) : MYRON A. BEIGLER and RONALD J. AMEN It is certified that error appears in the above-identified patent and that said Letters Patent are hereby corrected as shown below:

Column 6, line 38, "178" should read -- 1/2 --; Column 6, line 39, "3/8" should read -- 1/16 --; Column 7, line 41, "the" should read -- ate --; and Claim 5, line 1, "15" should read -- 4 --.

Signed and Sealed this

Twenty-seventh Day of September 1977

[SEAL]

Attest:

RUTH C. MASON
Attesting Officer

LUTRELLE F. PARKER
Acting Commissioner of Patents and Trademarks